(12) United States Patent
Hidaka et al.

(10) Patent No.: US 8,220,326 B2
(45) Date of Patent: Jul. 17, 2012

(54) FLOW SENSOR DEVICE HAVING A GAP FORMED BETWEEN A SENSOR DEVICE AND AN ENGAGING PORTION AND A POOLING PORTION FORMED IN THE GAP

(75) Inventors: Shinichiro Hidaka, Chiyoda-ku (JP); Masahiro Kawai, Chiyoda-ku (JP); Yuji Ariyoshi, Chiyoda-ku (JP); Hiroyuki Uramachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 314 days.

(21) Appl. No.: 12/642,147

(22) Filed: Dec. 18, 2009

(65) Prior Publication Data

US 2010/0313651 A1 Dec. 16, 2010

(30) Foreign Application Priority Data

Jun. 12, 2009 (JP) ................................. 2009-141228

(51) Int. Cl.
*G01F 1/68* (2006.01)
(52) U.S. Cl. .................................................. 73/204.26
(58) Field of Classification Search .......................... None
See application file for complete search history.

(56) References Cited

U.S. PATENT DOCUMENTS

| | | | | |
|---|---|---|---|---|
| 6,035,726 A * | 3/2000 | Bernard et al. | ............ | 73/204.14 |
| 6,382,023 B1 * | 5/2002 | Yonezawa et al. | ......... | 73/204.22 |
| 6,516,785 B1 * | 2/2003 | Nakada et al. | ............. | 73/204.26 |
| 6,923,053 B2 * | 8/2005 | Yamada et al. | ............. | 73/204.26 |
| 7,150,189 B2 * | 12/2006 | Tanaka et al. | ............. | 73/204.26 |
| 7,219,544 B2 * | 5/2007 | Tanaka et al. | ............. | 73/204.26 |
| 2005/0178196 A1 * | 8/2005 | Tanaka et al. | ............. | 73/204.26 |

FOREIGN PATENT DOCUMENTS

JP 09-026343 A 1/1997

* cited by examiner

*Primary Examiner* — Harshad Patel
(74) *Attorney, Agent, or Firm* — Sughrue Mion, PLLC

(57) ABSTRACT

Although flow detection accuracy deterioration due to a subject fluid inflow into a gap between a sensor device and an engaging portion is prevented by an underflow inhibitor, the underflow inhibitor overflow to a sensor device surface results in the subject fluid turbulence, causing a flow element output fluctuation risk. One solution is a configuration comprising a sensor device made of a planar semiconductor material with a heating element and an intake air temperature detection element formed thereon, a support member containing an engaging portion the sensor device is engaged to, which is placed at a passage the subject fluid circulates and underflow inhibitor being filled into a void between the sensor device and the support member to prevent the subject fluid from flowing into the void, and a pooling portion being placed to prevent the under flow inhibitor from overflowing out of the void.

12 Claims, 15 Drawing Sheets (a)

FLOW SENSOR DEVICE HAVING A GAP FORMED BETWEEN A SENSOR DEVICE AND AN ENGAGING PORTION AND A POOLING PORTION FORMED IN THE GAP

BACKGROUND OF THE INVENTION

1. Field of the Invention

The present invention relates to a flow element that measures a flow rate or a flow volume of a subject fluid based on the heat transfer phenomenon from a heating element or a part heated by a heating element and is used for measurement of, for example, an intake air flow of an internal combustion engine.

2. Description of the Related Art

A flow element utilizing a temperature dependent resistive element has conventionally been known. Such a flow element is equipped with a heating element and an intake air temperature detection element, and a sensor device controlled in such a way that the temperature of the heating element stays at a higher temperature by a certain temperature range than the temperature detected by an intake air temperature detection element is utilized to provide an output in the form of a voltage corresponding to a heat quantity the heating element radiates to the fluid.

As is described in Patent Document 1 (Japanese Patent Laid Open Hei 9-26343), for example, a flow element comprises of a cavity formed at the backside of a planar semiconductor material by partially removing the backside of the planar semiconductor material and a thin film having a detection element just over the cavity. Only one side of the sensor device is adhered to an engaging portion of a support member to form a floating support structure (cantilever support structure).

The flow element with a floating support structure, as is described in Patent Document 1, has such a problem that in a small flow volume of the subject fluid, it flows only over the surface of the sensor device, while, in a large flow volume of the subject fluid, it flows into a clearance gap between the sensor device and the engaging portion of the support member (hereinafter referred to as "underflow"), which leads to deterioration of flow detection accuracy. In order to solve such a problem, Patent Document 1 sets a canaliform slot within the engaging portion of the support member alongside the periphery of the sensor device so as to prevent the underflow from contacting directly to the sensor device.

However, such a structure cannot prevent the underflow sufficiently, because such a case happens that the underflow led into the slot overflows into a clearance gap between the sensor device and the engaging portion of the support member. One possible method to prevent the underflow of the flow element with a floating support structure is to use an underflow inhibitor which is a type of adhesive cement.

One such method, for example, is to apply first an underflow inhibitor 3 to the side surface of an engaging portion of a support member 2 as is shown in FIG. 17 (a), and then to engage a sensor device 1 into the engaging portion 2 as is shown in FIG. 17 (b), so that the underflow inhibitor 3 is filled up into the gap between the sensor device 1 and the engaging portion 2, which prevents the generation of the underflow.

However, in the flow element utilizing the underflow inhibitor 3, when the sensor device 1 is engaged to the engaging portion 2, occurrence of application quantity fluctuations of the underflow inhibitor 3 applied to the side surface of the engaging portion 2 could lead to the underflow inhibitor 3 sticking out of the front surface of the sensor device 1 and a cavity 4 of the backside of the sensor device 1 as a result of flow of the underflow inhibitor 3 in the direction of an arrow 18 as shown in FIG. 17 (c).

When the underflow inhibitor 3 sticks out to the front surface of the sensor device 1, turbulence of a flow 15 of the subject fluid at the front surface of the sensor device 1 is caused, and fluctuation of the flow element output occurs. Also, when the underflow inhibitor 3 sticks out into the cavity 4 of the backside of the sensor device 1, the stuck out underflow inhibitor 3 adheres to a thin film 23, which faces the risk of damage.

SUMMARY OF THE INVENTION

It is therefore an object of the present invention to solve the problems and to provide a flow element with high productivity along with high accuracy and high sensitivity of flow detection.

According to the present invention, a flow element comprises; a sensor device having a cavity provided by partially removing the backside of a planar semiconductor substrate, and a thin film having a thermo-sensitive resistor that detects a flow volume of a subject fluid just over the cavity, and a support member that has an engaging portion to which the sensor device is engaged and is located at a passage through which the subject fluid circulates, wherein an underflow inhibitor, which prevents the subject fluid from flowing into the cavity, is filled into a void, which has a pooling portion to pool the underflow inhibitor, formed between the sensor device and the engaging portion.

The flow element according to the present invention is equipped with the pooling portion for the underflow inhibitor in the void (gap) formed between the sensor device and the engaging portion of the support member, so that an excess amount of the underflow inhibitor can be let out into the pooling portion, thus preventing the underflow inhibitor from overflowing toward the sensor device surface. Consequently, turbulence of the subject fluid flow at the sensor device surface does not occur and the output fluctuations can be minimized, which results in improvement of the flow detection accuracy.

Concurrently, as sticking out of the excess amount of the underflow inhibitor toward the cavity can be prevented, the thin film can be protected from damage, and productivity of the flow element is improved.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
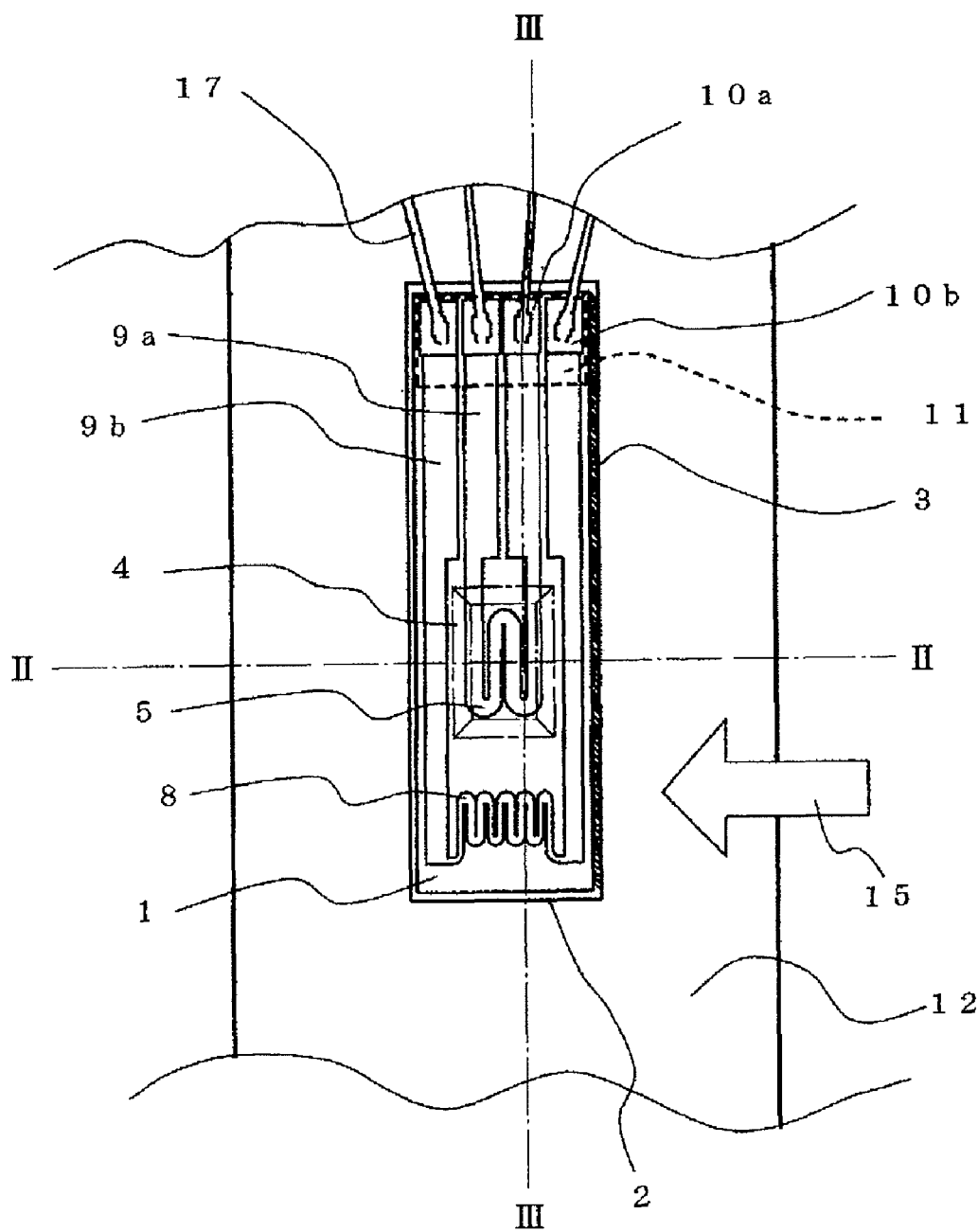
FIG. 1 is a top view of a support member equipped with a sensor device according to Embodiment 1 of the present invention.

Followings are descriptions of each preferred embodiments according to the present invention with reference to the accompanying drawings. Note that, in the accompanying drawings the same reference numerals represent the same or equivalent components.

Embodiment 1

A flow element according to Embodiment 1 comprises a sensor device having a thin film, and a support member, which is laid in a passage of a subject fluid, having an engaging portion of the sensor device. The sensor device is provided with a cavity formed by partially removing the back side of a planar semiconductor substrate. The film on which a detective element is formed covers the upper part of the cavity. The sensor device is engaged in the engaging portion of the support member and adhered thereto with a die bonding agent. Avoid (gap), which has a pooling portion that pools an underflow inhibitor, between the sensor device and the engaging portion of the support member is filled with the underflow inhibitor that prevents so-called afflux of underflow.

Hereinafter, the structure of the sensor device 1 and its manufacturing process according to Embodiment 1 will be described with reference to FIG. 1 through FIG. 7.

Figure 4:
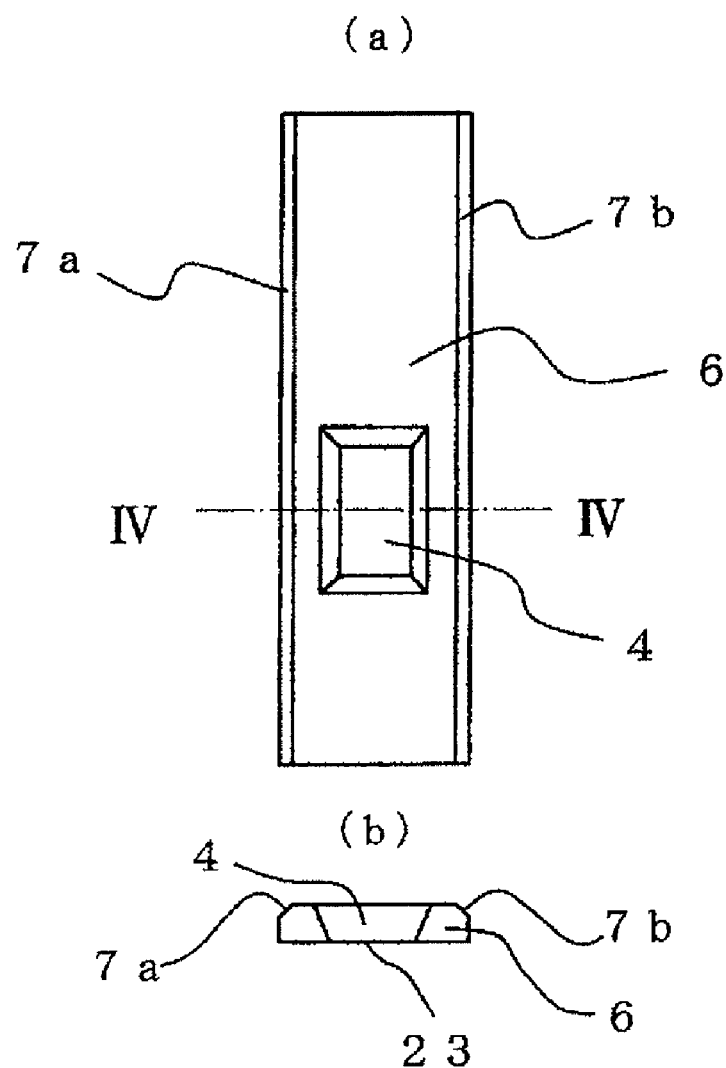
FIG. 4 is an illustration of a sensor device proper according to Embodiment 1, (a) being a bottom view of the sensor device and (b) being a schematic cross-sectional view of the sensor device along the line IV-IV in FIG. 4 (a).

As shown in FIG. 4, the sensor device 1 has a thin film 23, on which a detection element (thermo-sensitive resistor for detecting flow volume of a subject fluid) is formed, on the upper part of a cavity 4 which is made at the backside of a planar semiconductor substrate 6 by partially removing the backside of the planar semiconductor substrate 6. Also, notches 7a and 7b, the function of which are described hereinafter, are formed at the edges of both longitudinal sides of the backside of the planar substrate 6. The notches 7a and 7b, in Embodiment 1, extend to both longitudinal ends of the sensor device 1.

In the next place, the manufacturing process of the sensor device 1 will be described.

Figure 6:
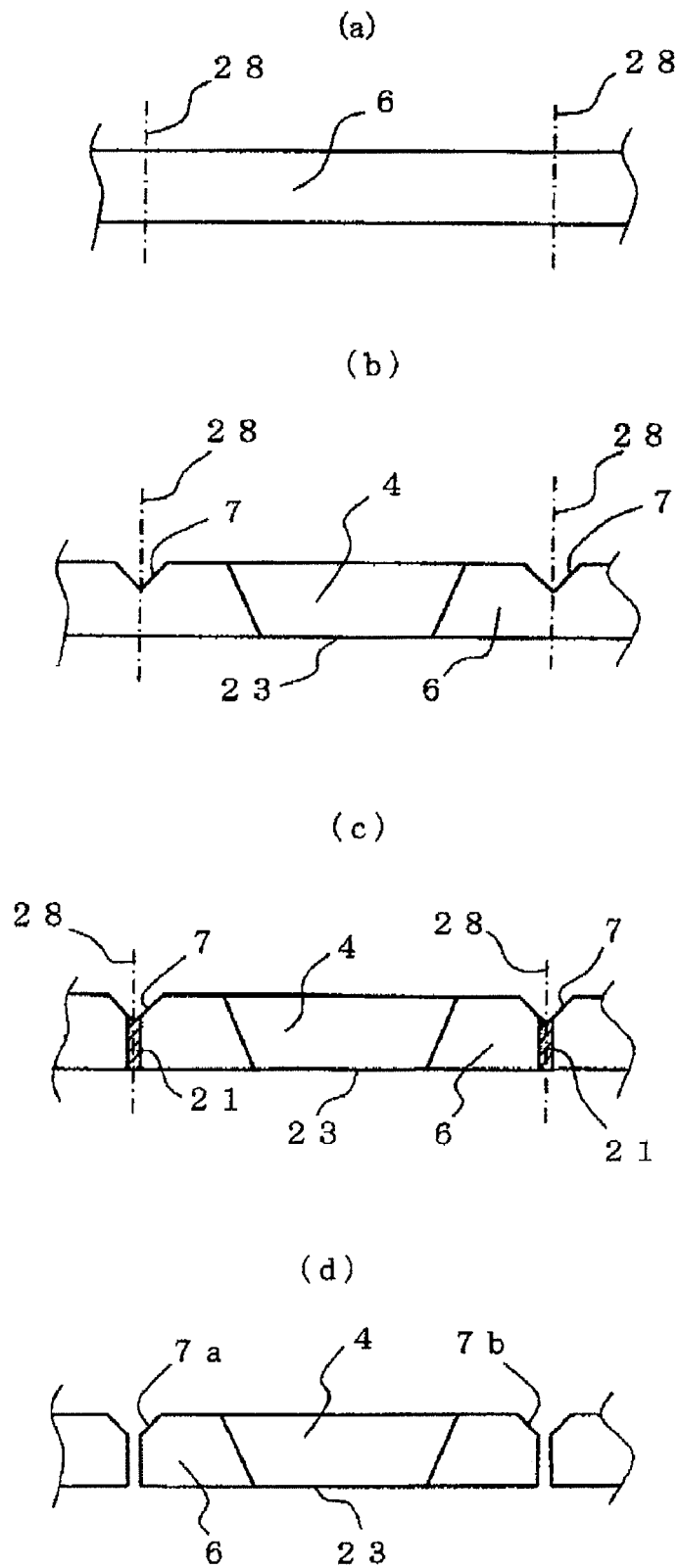
FIG. 6 is an illustration representing schematic cross-sectional views of the sensor device under processing conditions before and after chip split according to Embodiment 1, (a) being a cross-sectional view of a planar material, (b) being a cross-sectional view representing the processing status of a cavity 4 and a notch 7, (c) being a cross-sectional view representing chip split processing status and (d) being a cross-sectional view of a chip after chip split processing.
Figure 7:
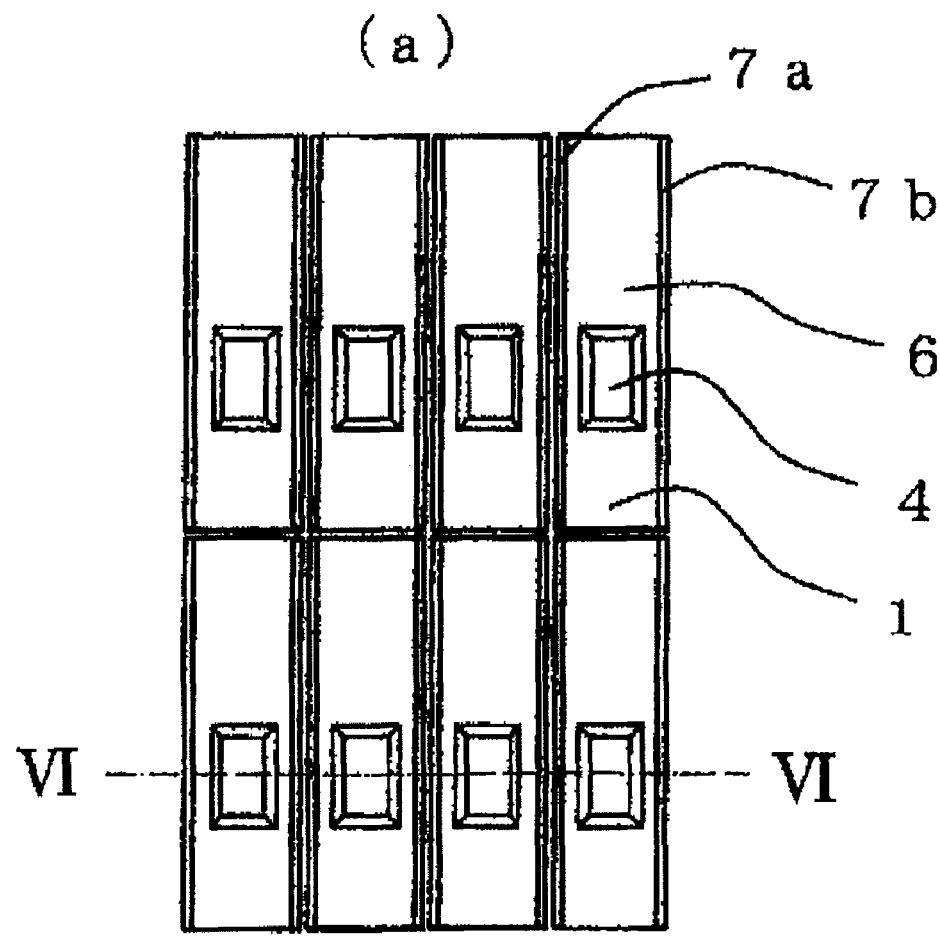
FIG. 7 is an illustration representing juxtaposed sensor devices after gridiron split according to Embodiment 1, (a) being a bottom view of the sensor devices and (b) being a schematic cross-sectional view of the sensor devices along the line VI-VI in FIG. 7.
Figure 7:
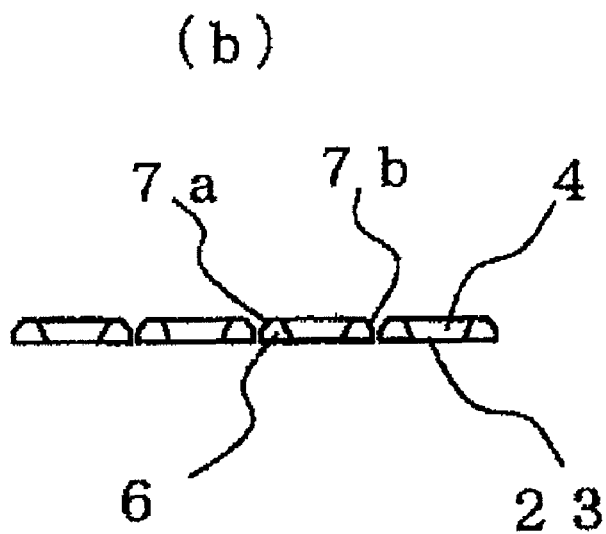

As shown in FIG. 1 and FIG. 6, an insulating supporting film consisting of Silicon Nitride and such is formed on the planar silicon material (substrate) 6 by sputtering or CVD (Chemical Vapor Deposition), for example, and then a heating element 5 made of thermo-sensitive resistor film consisting of platinum and such is formed on top of this insulating supporting film by vapor deposition or sputtering methods. The heating element 5 is, by photoengraving or wet or dry etching methods and such, formed into a pattern which becomes a current path. Also, an intake air temperature detection element 8 consisting of a thermo-sensitive resistor film made of platinum and such are formed by the same method. Further, an insulating and protective film (not shown in the Figures) consisting of Silicon Nitride and such is formed on top of the heating element 5 by sputtering, CVD or and such.

The heating element 5 is connected to an electrode 10a to secure an electric connection with external circuits through a lead portion 9a. Also, the intake air temperature detection element 8 is connected to an electrode 10b through a lead portion 9b. The protection film of the electrodes 10a and 10b are removed for securing electrical connections with the external circuits by wire bonding and such.

Figure 5:
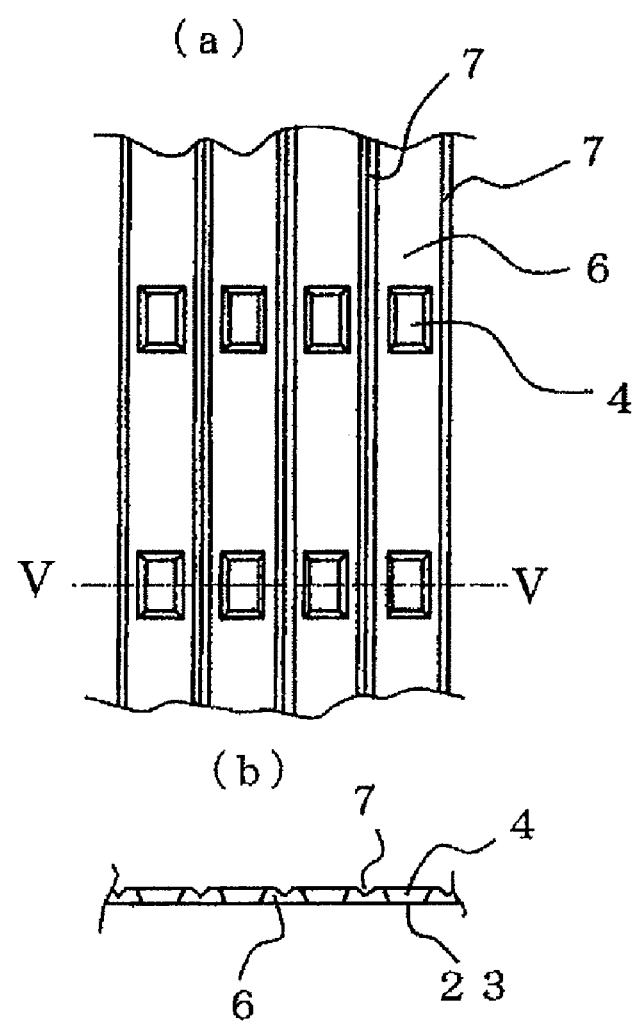
FIG. 5 is an illustration of a cluster of the sensor device before chip split according to Embodiment 1, (a) being a bottom view of the sensor devices and (b) being a schematic cross-sectional view of the sensor devices along the line V-V in FIG. 5 (a).

Furthermore, after forming etching holes through the surface protection film formed on the side opposite to the surface of the planar substrate 6 on which the supporting film 23 is formed, the cavity 4 and the notch 7 are simultaneously formed by a wet etching method as is shown in FIG. 5 and FIG. 6 (b).

At this time, the cavity 4 is formed under the heating element 5. The notch 7 is formed in such a configuration that an apex position 29 of the notch overlaps with the boundary 28 of the sensor device. In such processes, a plurality of sensor devices are formed on the silicon planar base material (substrate).

After this procedure, the sensor device 1, as shown in FIG. 6 (*d*), is obtained by cutting off the area 21 (hereinafter referred to as "dicing area") by a dicing saw as shown in FIG. 6 (*c*). Further, a cluster of sensor devices shown in FIG. 5 and FIG. 6 are made into a chip type (rectangle) of the sensor device 1 shown in FIG. 7 by gridironing with a dicing saw. In addition, the notches 7, which are provided at the longitudinal sides of the planar substrate 6, have an upstream side notch 7*a* and a downstream side notch 7*b*. The upstream side notch 7*a* serves as a part of the pooling portion, as is described later.

Figure 2:
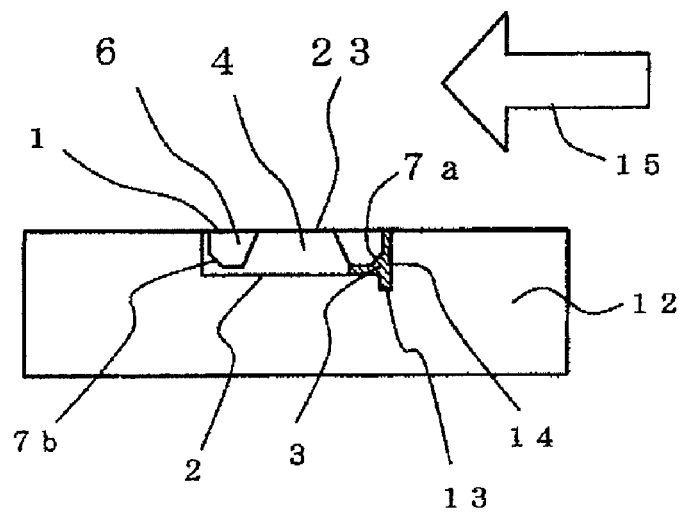
FIG. 2 is a schematic cross-sectional view of the support member with the sensor device along the line II-II in FIG. 1.
Figure 3:
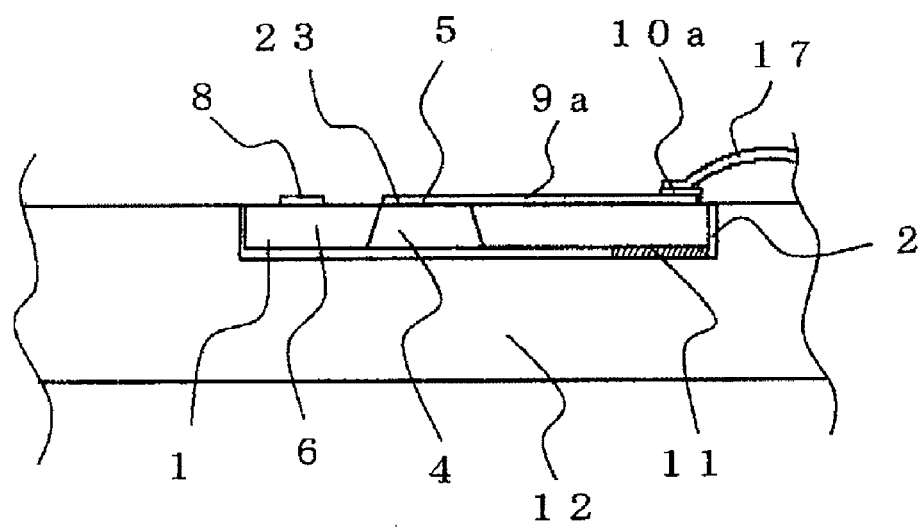
FIG. 3 is a schematic cross-sectional view of the support member with the sensor device along the line III-III in FIG. 1.
Figure 8:
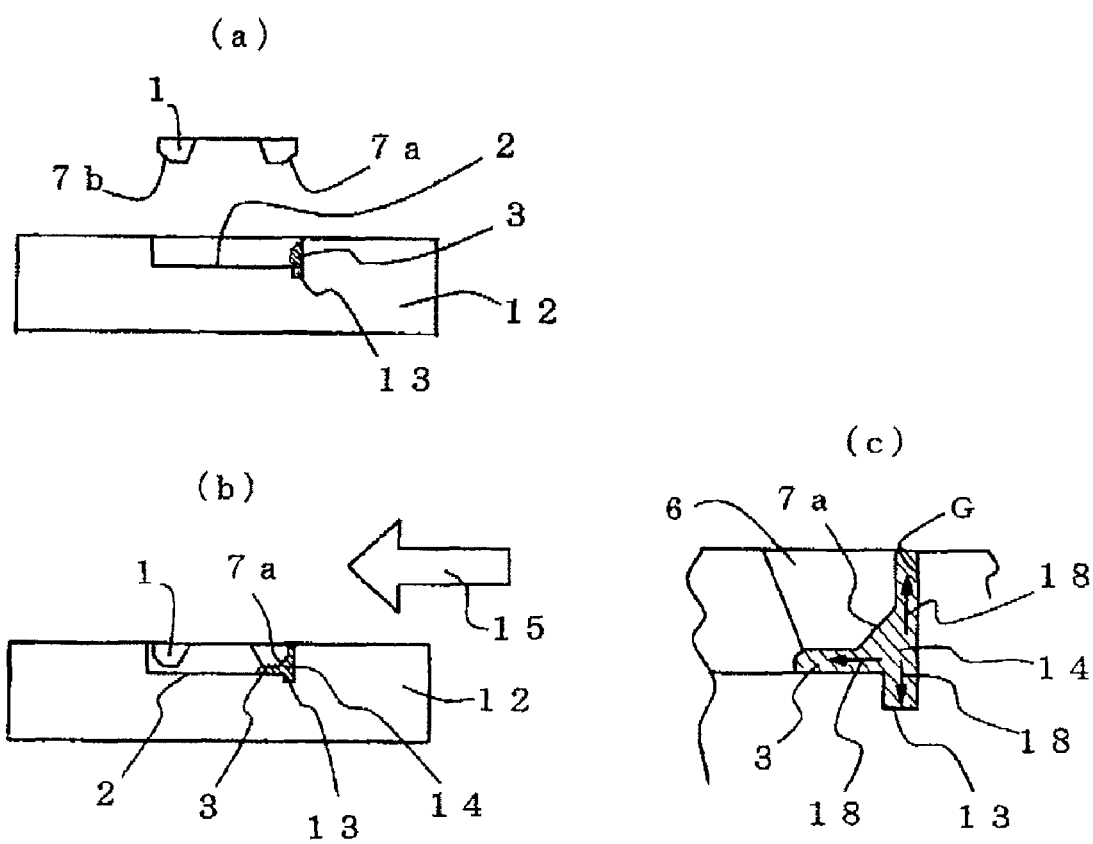
FIG. 8 is an illustration representing schematic cross-sectional views of the support member before and after engaging the sensor device according to Embodiment 1, (a) being a cross-sectional view of the support member before engaging the sensor device, (b) being a cross-sectional view of the support member after engaging the sensor device and (c) being a magnified cross-sectional view of the substantial part of (b).

In the next place, referring to FIG. 2, FIG. 3 and FIG. 8, the structure of the engaging portion 2 and the engaging process of the sensor device 1 into the engaging portion 2 according to Embodiment 1 is described. The engaging portion 2 is a hollow that accepts the whole sensor device 1. Also, a long groove 13, for example, that forms a part of the pooling portion, as will be described later, is placed on the bottom face on the upstream side of the engaging portion 2. (Refer to FIG. 2)

The sensor device 1 is adhered to the engaging portion 2 by a die bonding agent. (Refer to FIG. 3) The die bonding agent 11 is applied to the bottom face of the engaging portion 2 in advance and the area for the die bonding agent to be applied is the area that contacts the backside of the planar material 6 where the electrodes 10*a* and 10*b* of the sensor device 1 are provided (the area of the sensor device 1 corresponding to the bottom face of the engaging portion of the support directly above which the electrodes 10*a* and 10*b* are positioned).

Furthermore, as shown in FIG. 8 (*a*), filler, namely the underflow inhibitor 3, is also applied to the side surface of the upstream side of the engaging portion 2 in advance and then the sensor device 1 is engaged to the engaging portion 2.

When the sensor device 1 is engaged to the engaging portion 2, the underflow inhibitor 3 moves through the void (gap) G between the sensor device 1 and the engaging portion 2, and fills the void G to the same level as that of the surface of the support member 12. Here, the die bonding agent 11 is a thermosetting adhesive and the underflow inhibitor 3 is a room temperature setting adhesive.

Thermosetting adhesive is easy to control the curing level so that the utilization of the die bonding agent 11 can avoid advancing to the next process with incomplete adhesion between the sensor device 1 and the support member 12. The room temperature setting adhesives, which is hard to spread at the time of setting compared with the thermosetting adhesives, can be prevented from overflowing the surface of the sensor device 1 and the cavity 4 while setting.

According to Embodiment 1, when the sensor device 1 is engaged to the engaging portion 2, an excess amount of the underflow inhibitor 3 does not flow over the surface of the sensor device 1 as shown in FIG. 8 (*c*), because the excess amount of the underflow inhibitor 3 escapes to the pooling portion 14 configured with the upstream side notch 7*a* at the backside of the sensor device 1 and the long groove 13. This arrangement can prevent the flow of the subject fluid at the surface of the sensor device 1 from being disturbed, thus the fluctuation of the output can be minimized. Also, the excess amount of the underflow inhibitor 3, which does not reach to the cavity 4, does not damage the thin film 23.

In case the underflow inhibitor 3 is not filled up toward the same height as that of the surface of the support member 12, dust might be heaped up on the underflow inhibitor 3. When the heap volume of dust on the underflow inhibitor 3 changes, the flow of the subject fluid over the surface of the sensor device 1 fluctuates, thus causing the fluctuation in the output of the flow element, which deteriorates the flow detection accuracy.

In Embodiment 1, the underflow inhibitor 3 is filled to the same height as that of the surface of the support member 12. Although there is a possibility that a certain height of step is generated between the surface of the sensor device 1 and the surface of the support 12 depending on the thicknesses of the die bonding agent 11 at the backside of the sensor device 1 and the underflow inhibitor agent 3, deterioration of the flow detection accuracy can be prevented by filling the underflow inhibitor 3 at least to the height of the surface of the support member.

The above descriptions have shown an example that the pooling portion 14 is configured both with the upstream side notch 7*a* and the long groove 13, but it is noted that the same effect can be obtained when the pooling portion 14 is configured either only by the upstream side notch 7*a* or only by the long groove 13.

Embodiment 2

Figure 9:
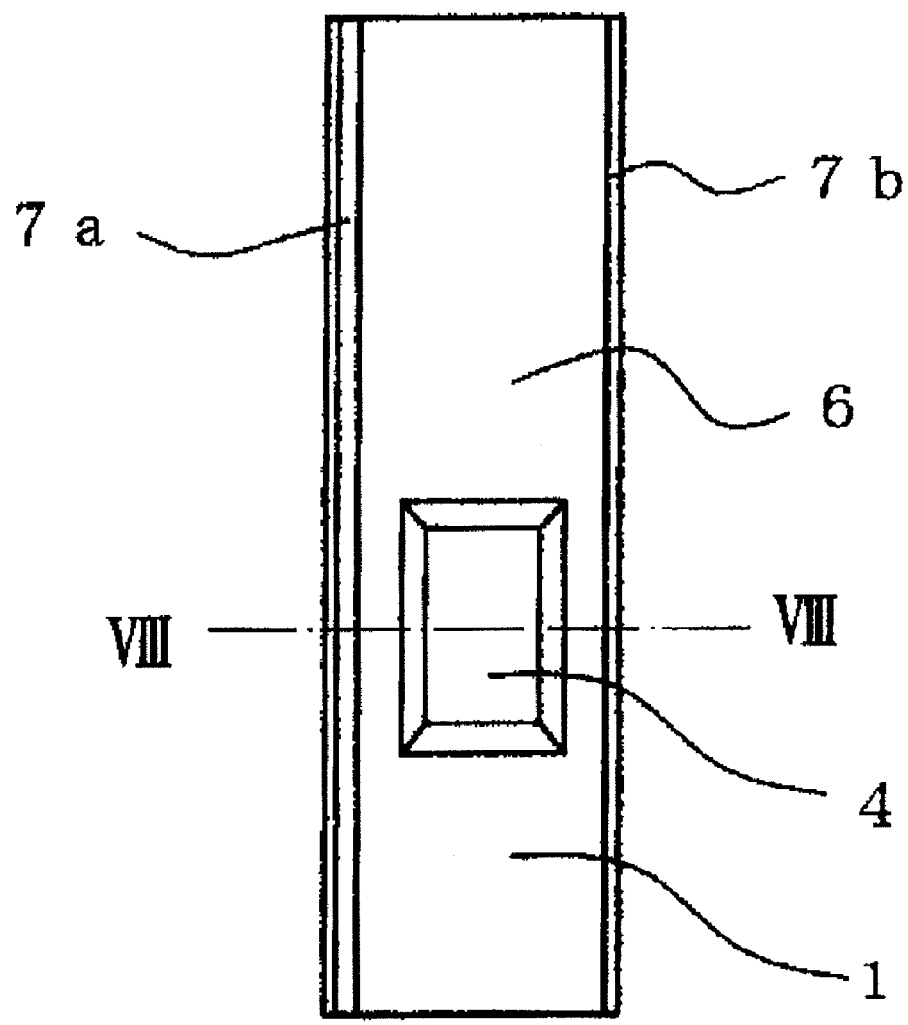
FIG. 9 is an illustration of the sensor device according to Embodiment 2, (a) being a bottom view of the sensor device and (b) being a schematic cross-sectional view of the sensor device along the line VIII-VIII in FIG. 9 (a).
Figure 9:
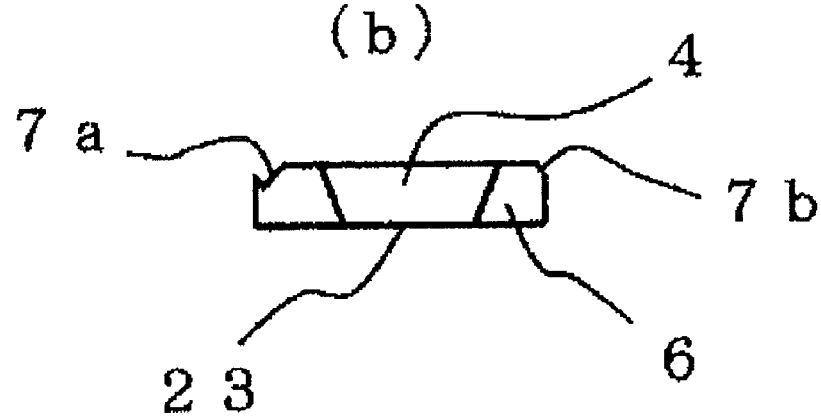

In the next place, Embodiment 2 will be described with reference to FIG. 9 and FIG. 10. The manufacturing process of the sensor device according to Embodiment 2 is similar to that of Embodiment 1. When the planar material (substrate) 6, consisting of a plurality of sensor devices, is divided, the notches 7*a* and 7*b* are simultaneously formed at the edges of both longitudinal side of the backside of the sensor device 1. In the forming of the notches 7*a* and 7*b*, the downstream side notch 7*b* becomes relatively smaller than the upstream side notch 7*a* as shown in FIG. 10.

Such a manufacturing process of the notches 7*a* and 7*b* will be described hereinafter.

Figure 10:
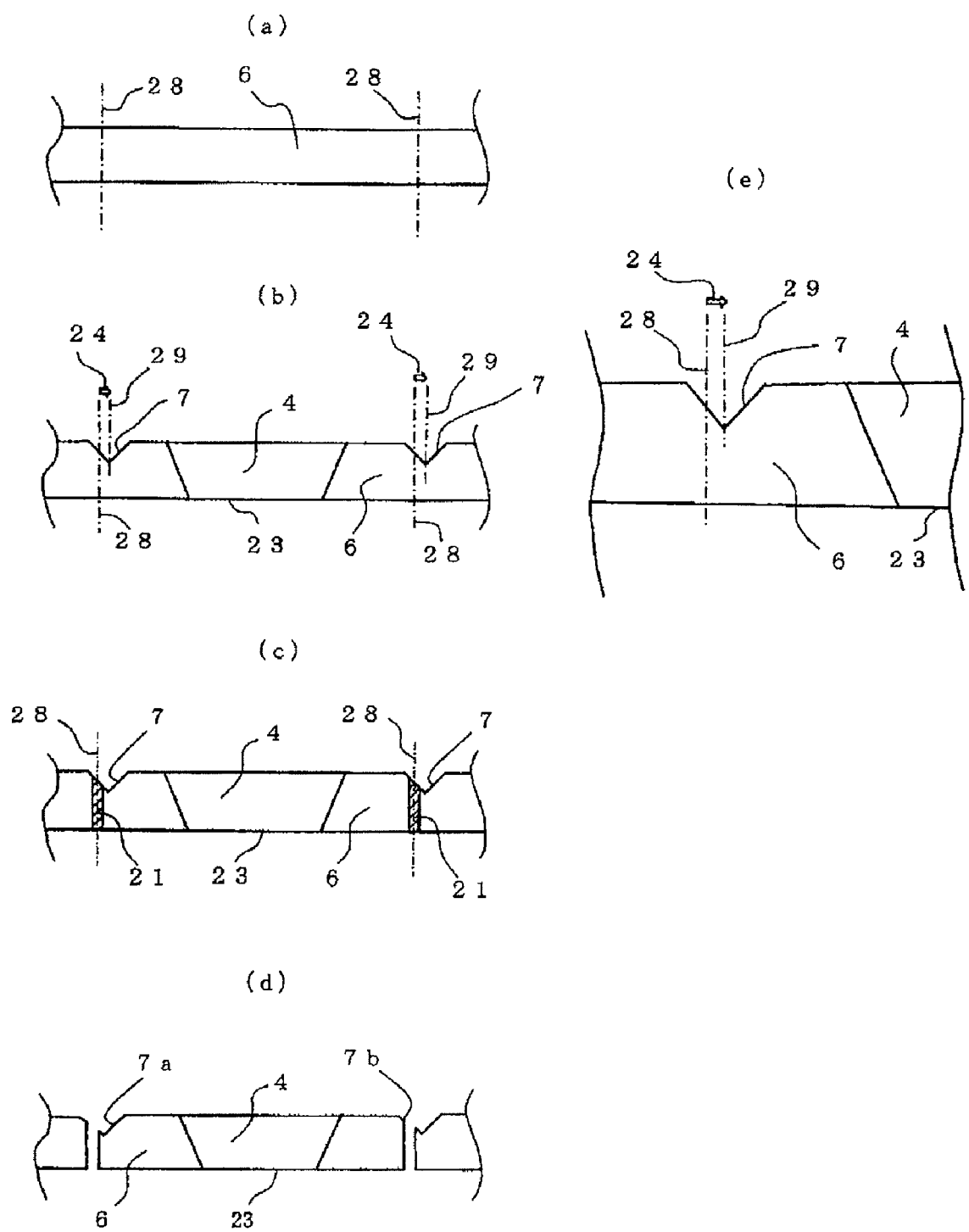
FIG. 10 is an illustration representing schematic cross-sectional views of the sensor device under processing conditions from before chip split to after chip split according to Embodiment 2, (a) being a cross-sectional view of the planar material, (b) being a cross-sectional view of the sensor device representing the processing status of the cavity and the notch, (c) being a cross-sectional view of the sensor device representing processing status of chip split, (d) being a cross-sectional view of the sensor device after chip split and (e) being magnified cross-sectional views of the substantial part of (d).

In the manufacturing process of the sensor device 1, the steps of the formation of the cavity 4 and the notch 7 in the planar substrate 6, as shown in FIG. 10 (*a*), is the same as that of Embodiment 1. That is, the cavity 4 is formed under the heating element 5 in the same way as that of Embodiment 1, as shown in FIG. 10(*b*). Note that the reference number 28 represents the cutting boundary when the sensor device is divided. In Embodiment 2, the notch 7 is formed by etching in such a way that the apex position 29 of the notch 7 is located at the offset position, as shown in FIG. 10 (*e*), from the boundary 28 in the direction of an arrow 24. After this procedure, by cutting the dicing region 21 centering on the boundary 28 of the sensor device as shown in FIG. 10 (*c*), the downstream side notch 7*b* is processed to be smaller than the upstream side notch 7*a* as shown in FIG. 10 (*d*).

The reason for making the downstream side notch 7*b* smaller than the upstream side notch 7*a* is as follows. The underflow can be prevented by filling the upstream side gap between the sensor device 1 and the engaging portion 2 with the underflow inhibitor 3. However, there may be a risk of flow detection accuracy deterioration, if the gap on the downstream side is enlarged, because the underflow tends to spread through the gap on the downstream side. Also, because formation of the notch 7 leads to weakening of the mechanical strength of the sensor device 1, it is desirable to omit the unnecessary notch 7*b* at the downstream side. According to Embodiment 2, the downstream side notch 7*b* is made to be smaller than the upstream side notch 7*a*, which prevents the sensor device 1 from weakening the mechanical strength of the sensor device 1 and deteriorating the flow detection accuracy.

Embodiment 3

Figure 11:
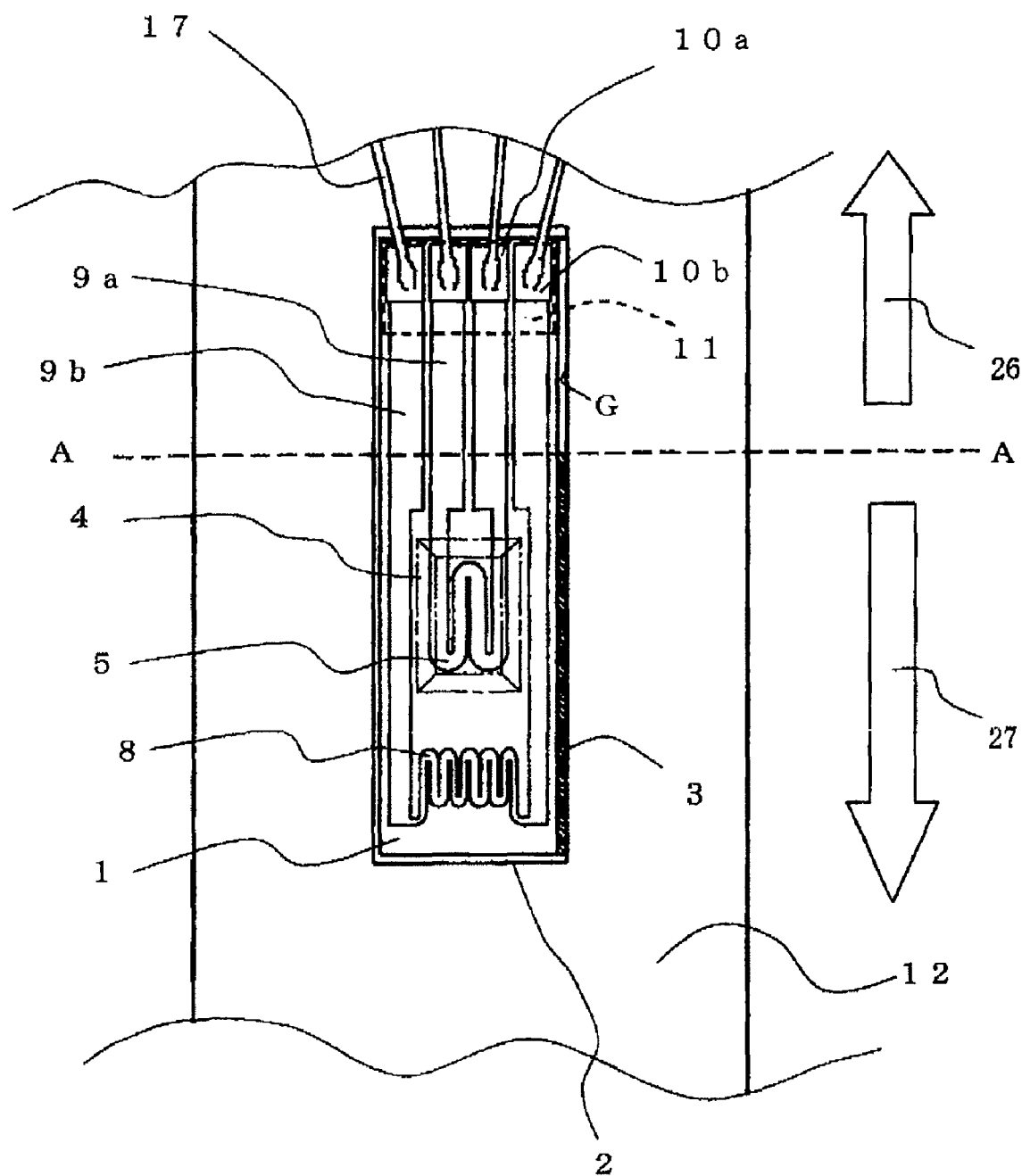
FIG. 11 is a top view of the support member equipped with the sensor device according to Embodiment 3.
Figure 12:
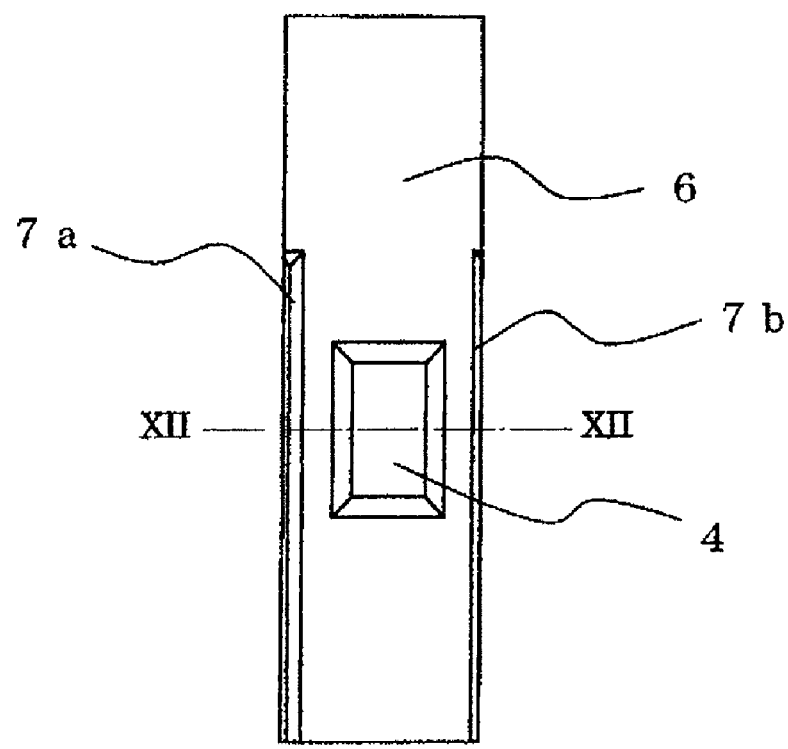
FIG. 12 is an illustration of the sensor device according to Embodiment 3, (a) being a bottom view of the sensor device and (b) being a schematic cross-sectional view of the sensor device along the line XII-XII in FIG. 12 (a).
Figure 12:
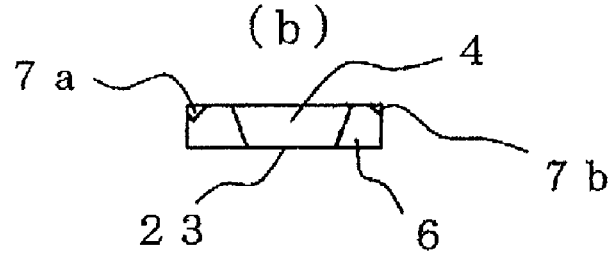

In the next place, Embodiment 3 will be described with reference to FIG. 11 and FIG. 12. According to Embodiment 3, the upstream side notch 7*a* and the downstream side notch 7*b* of the sensor device 1 are provided only at the region that contributes to flow detection, as shown in FIG. 11 and FIG.

12. Here, the region that contributes to flow detection is a region 27, where the heating element and the intake air temperature detection elements 8 are exposed to the subject fluid.

The underflow inhibitor 3 is applied to the region corresponding to the upstream side notch 7a located at the upstream side surface of the engaging portion of the support 2 before the sensor device 1 is engaged to the engaging portion 2. As a region 26 is not exposed to the subject fluid, the underflow is not generated and application of the underflow inhibitor 3 becomes unnecessary.

In Embodiments 1 and 2, the notches 7 of the neighboring sensor devices 1, after the cavity 4 and the notch 7 are already provided on the planar substrate 6, extend from end to end before being split into chips. So there is a risk that the planar substrate 6 (silicon wafer) is cracked around the notch 7.

In Embodiment 3, because the notch 7 is not formed at the region of the backside ends of the sensor devices 1 which is not exposed to the subject fluid, and further, the notches 7 of the sensor devices 1 are not continuously extended to the neighboring sensor devices, the breakage of the planar substrate 6 around the notch 7 before being split into chips is avoided. The effects of Embodiments 1 and 2 that the sticking out of the excess amount of the underflow inhibitor 3 to the surface of the sensor device 1 and the cavity 4 apply to Embodiment 3.

Embodiment 4

Figure 13:
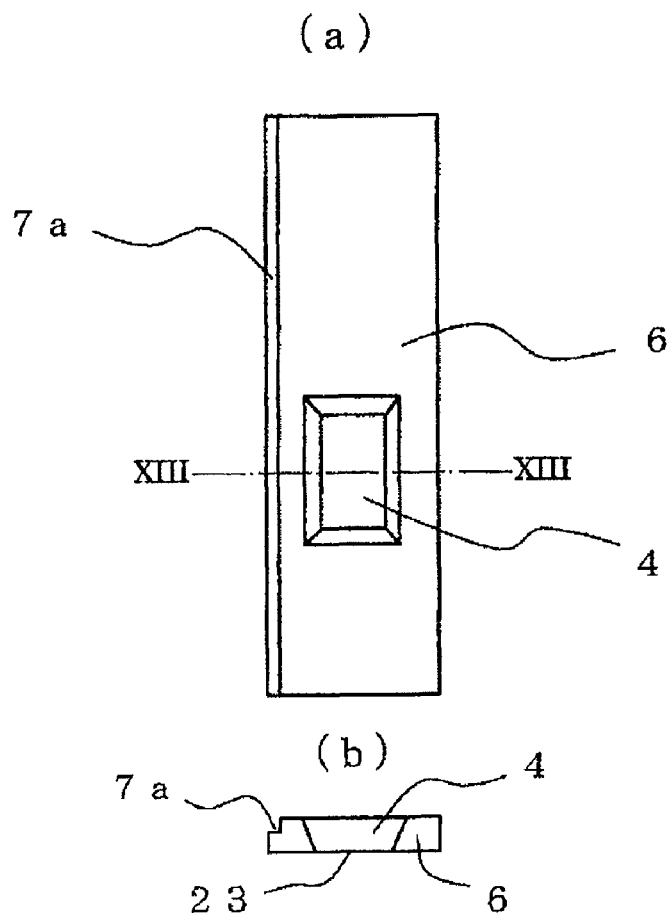
FIG. 13 is an illustration of the sensor device according to Embodiment 4, (a) being a bottom view of the sensor device and (b) being a schematic cross-sectional view of the sensor device along the line XIII-XIII in FIG. 13 (a).
Figure 14:
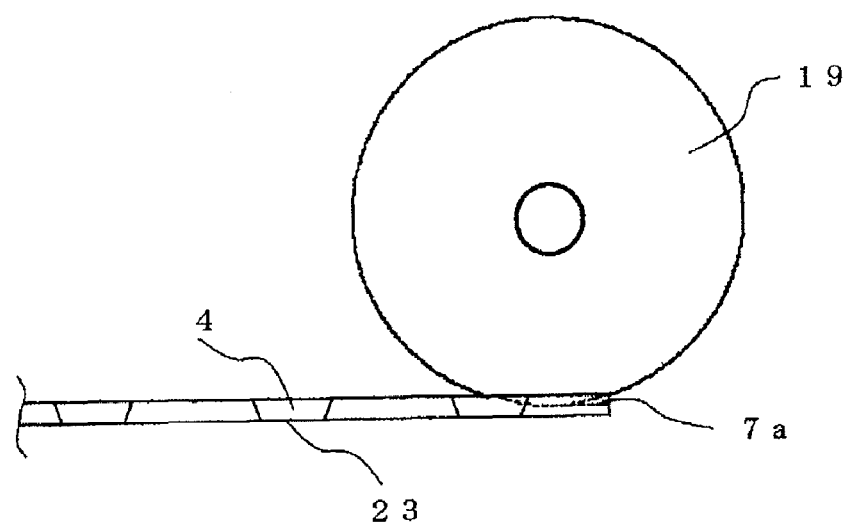
FIG. 14 is an illustration describing the processing status of the notch by a dicing saw according to Embodiment 4.

Embodiment 4 will be described with reference to FIG. 13 and FIG. 14. In Embodiment 4, the upstream side notch 7a at the backside of the sensor device 1, as is the case of Embodiment 2, is made by grinding the planar substrate 6 from the backside by a dicing saw 19 just before chip split as shown in FIG. 14. Note that the downstream side notch 7b is omitted in Embodiment 4.

According to Embodiment 4, productivity is improved, because the forming of the notch 7a and chip split are serially performed using the same tool. Also, breaking off of the planar substrate 6 (silicon wafer) around the notch 7a can be prevented as is the case of Embodiment 3, because the notch 7a is not formed on the planar substrate 6 in the processes prior to the usage of the dicing saw 19. The effects of Embodiments 1 to 3 that sticking out of the excess amount of the underflow inhibitor 3 to the surface of the sensor device 1 and to the cavity portion 4 are prevented apply to Embodiment 4.

Embodiment 5

Embodiment 5 will be described with reference to FIG. 15 and FIG. 16. In Embodiment 5, a concave portion (widened portion) 16 is provided at the upstream side surface of the engaging portion 2 by widening the void (gap) G so that the concave portion 16 serves as a pooling portion 14 for the underflow inhibitor 3 together with the upstream notch 7a and the long groove 13, as shown in FIG. 16.

According to Embodiment 5, because the capacity of the pooling portion 14 for the underflow inhibitor 3 becomes larger, sticking out of the excess amount of the underflow inhibitor 3 toward the surface of the sensor device 1 and the cavity 4 can be further constrained than the case of Embodiment 1.

Figure 15:
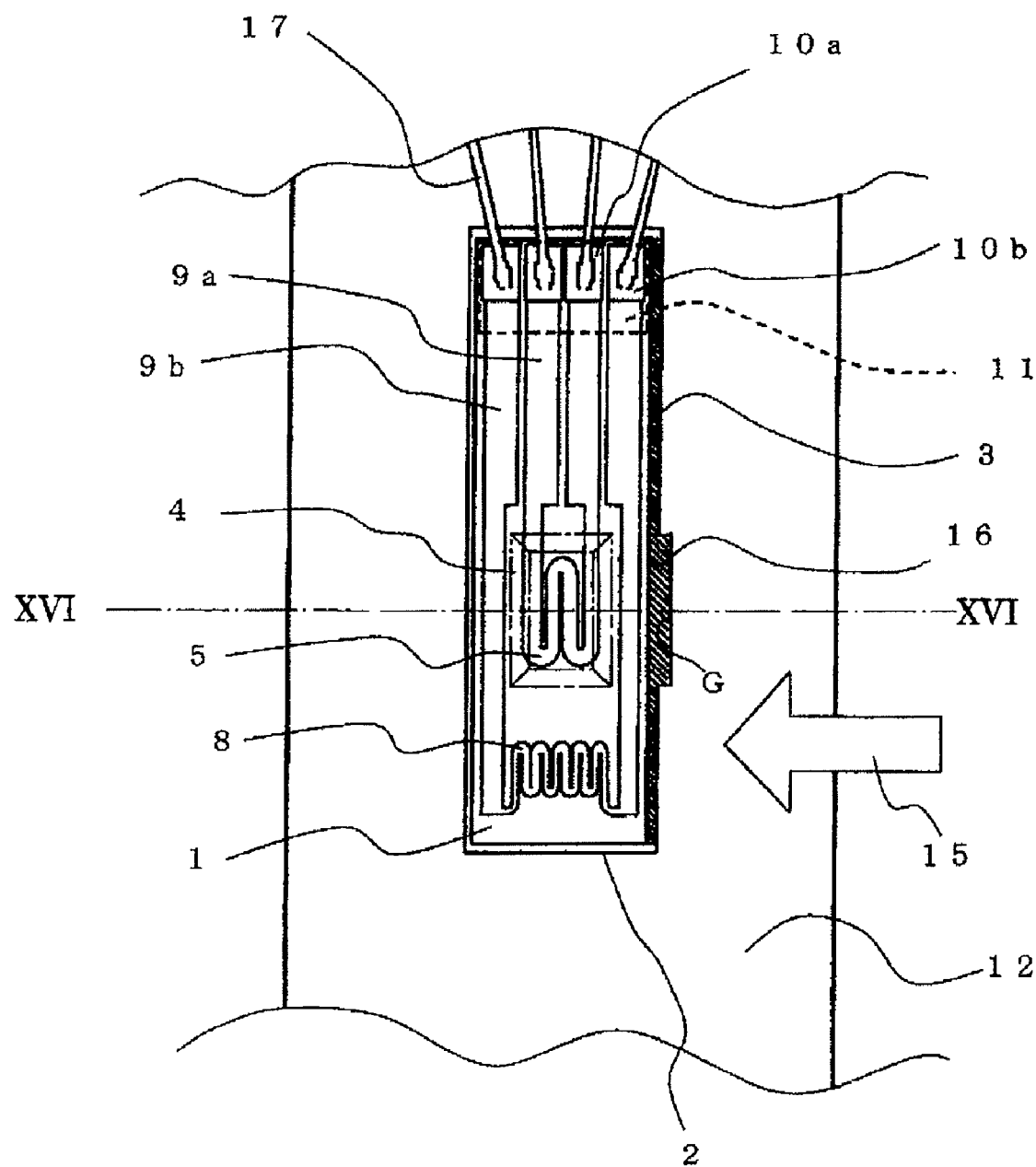
FIG. 15 is a top view of the support member equipped with the sensor device according to Embodiment 5.
Figure 16:
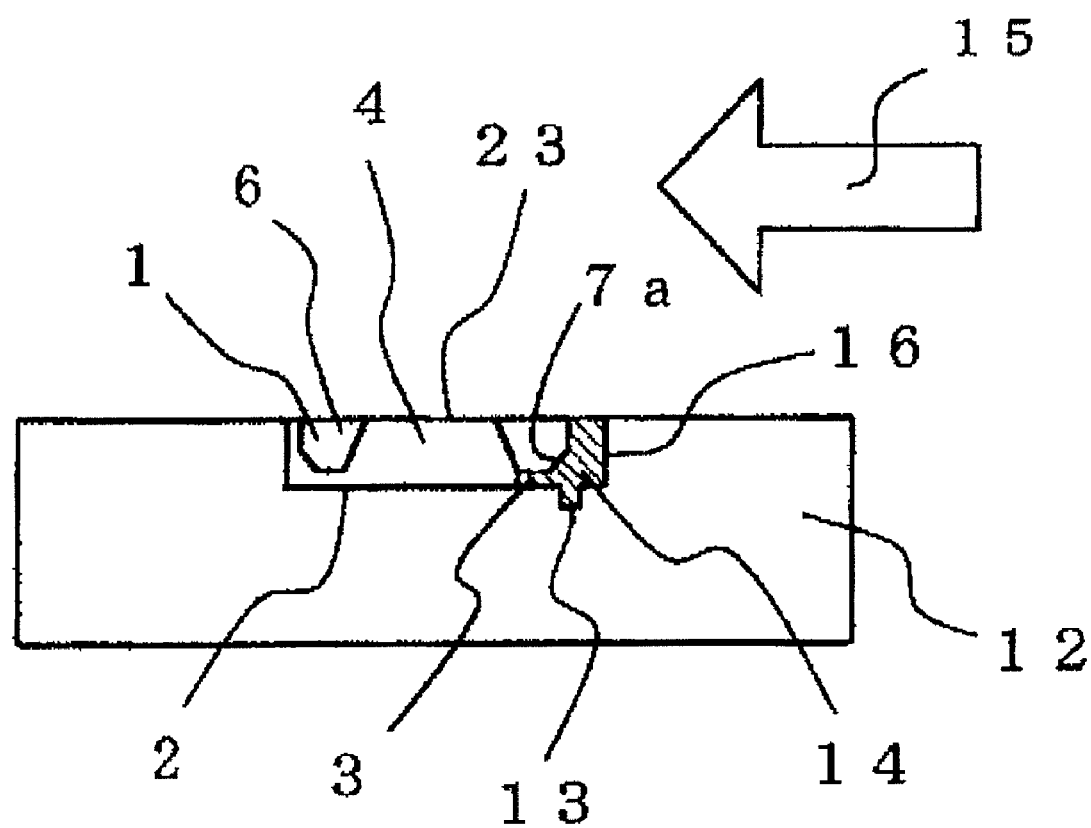
FIG. 16 is a schematic cross-sectional view of the sensor device along the line XVI-XVI in FIG. 15.
Figure 17:
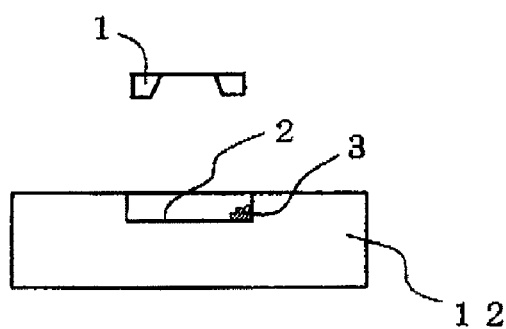
FIG. 17 is a schematic cross-sectional view of the support member describing the defect of the support member at the time of engaging the sensor device, (a) being a cross-sectional view of the support member and the sensor device before being engaged, (b) being a cross-sectional view after engaging the sensor device to the support member and (c) being a magnified section of the substantial part of (b).
Figure 17:
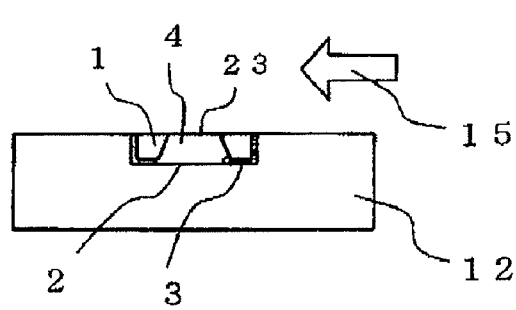
Figure 17:
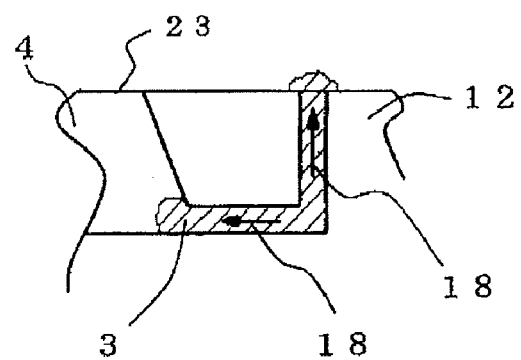

Although FIG. 15 and FIG. 16 show an example that the concave portion (widened portion) 16 of the engaging portion 2 is added to the structure of Embodiment 1, the pooling portion 14 can be configured by a combination of either two or more of the notch 7, the long groove 13 and concave portion 16, and furthermore the similar effects can be obtained when the concave portion (widened portion) 16 is added to those preferred embodiments.

What is claimed is:
1. A flow element comprising:
a sensor device containing a cavity formed by partially removing a backside of a planar semiconductor substrate and a thin film laid over the cavity, the thin film on which a thermo-sensitive resistor that detects a flow volume of a subject fluid is formed,
a support member containing an engaging portion to which the sensor device is engaged and is placed at a passage through which the subject fluid circulates,
wherein:
an underflow inhibitor that prevents the subject fluid from flowing into the cavity from an upstream side is filled into a gap formed between the sensor device and the engaging portion,
the gap has a pooling portion configured to hold a portion of the underflow inhibitor,
the pooling portion includes a groove extending downwards into the support member and formed at a bottom of the engaging portion or a portion of the gap wider than a remainder of the gap.

2. The flow element according to claim 1, wherein the wider portion of the gap is created by providing a notch formed at an edge of backside of the sensor device.

3. The flow element according to claim 2, wherein the cavity and the notch are formed simultaneously by etching the semiconductor substrate.

4. The flow element according to claim 2, wherein the sensor device is obtained by cutting out the semiconductor substrate containing a plurality of the sensor devices by a dicing saw, and the notch is formed at a time when the substrate is cutting out by the dicing saw.

5. The flow element according to claim 2, wherein notches are provided at an upstream side and a downstream side of the passage, and the notch provided at a downstream side is smaller than the notch provided at an upstream side.

6. The flow element according to claim 5, wherein the sensor device is obtained by cutting out the semiconductor substrate containing a plurality of the sensor devices at a position of the notches, which are formed at an upstream side and a downstream side of the passage by etching, and the position for etching region is offset against the cutting position of the plurality of the sensor devices so that the notch formed at a downstream side is smaller than the notch at an upstream side.

7. The flow element according to claim 1, wherein the pooling portion is a concave portion formed at a side surface of the engaging portion by widening the gap.

8. The flow element according to claim 1, wherein the pooling portion is configured by combination of two or more elements including the notch formed at an edge of a backside of the sensor device, the groove formed at a backside of the engaging portion, and the concave portion formed at a side surface of the engaging portion by widening the gap.

9. The flow element according to claim 1, wherein the pooling portion is provided only at a gap on an upstream side of the passage.

10. The flow element according to claim 1, wherein the pooling portion is provided only at a region corresponding to a position of a thermo-sensitive resistor that contributes to flow detection of the subject fluid.

11. The flow element according to claim 1, wherein the underflow inhibitor is a room temperature setting adhesive.

12. The flow element according to claim 1, wherein the underflow inhibitor is filled up to the same height as that of the surface of the support member.

* * * * *